(12) United States Patent
Chang (10) Patent No.: US 7,681,845 B1
(45) Date of Patent: Mar. 23, 2010

(54) SUPPORTING STAND HAVING LIFTING AND POSITIONING MEANS

(75) Inventor: Hung-Wei Chang, Banciao (TW)

(73) Assignee: Syncmold Enterprise Corp., Taipei County (TW)

( * ) Notice: Subject to any disclaimer, the term of this patent is extended or adjusted under 35 U.S.C. 154(b) by 0 days.

(21) Appl. No.: 12/289,559

(22) Filed: Oct. 30, 2008

(51) Int. Cl.
*F16M 11/00* (2006.01)
(52) U.S. Cl. .................................. 248/161; 248/917
(58) Field of Classification Search .............. 248/157, 248/132, 161, 404, 917; 361/679.02
See application file for complete search history.

(56) References Cited

U.S. PATENT DOCUMENTS

| 6,702,238 | B1 * | 3/2004 | Wang ....................... 248/125.8 |
| 6,994,303 | B2 * | 2/2006 | Lin et al. .................. 248/122.1 |
| 2004/0004165 | A1 * | 1/2004 | Hong et al. ................. 248/132 |
| 2005/0145672 | A1 * | 7/2005 | Schwemberger et al. . 227/176.1 |
| 2007/0064380 | A1 * | 3/2007 | Shin .......................... 361/681 |
| 2007/0152125 | A1 * | 7/2007 | Lee ............................ 248/398 |
| 2008/0117574 | A1 * | 5/2008 | Lee ............................ 361/681 |
| 2008/0192417 | A1 * | 8/2008 | Hwang et al. ............... 361/681 |
| 2008/0251678 | A1 * | 10/2008 | Lien et al. .................... 248/404 |
| 2009/0001239 | A1 * | 1/2009 | Dong et al. ................. 248/393 |
| 2009/0166502 | A1 * | 7/2009 | Wang et al. ................. 248/423 |
| 2009/0173845 | A1 * | 7/2009 | Wang et al. ................. 248/121 |

FOREIGN PATENT DOCUMENTS

TW M324945 1/2008

* cited by examiner

*Primary Examiner*—Ramon O Ramirez
(74) *Attorney, Agent, or Firm*—Rosenberg, Klein & Lee (57) ABSTRACT

A supporting stand having a lifting and positioning means includes a support, a sliding body, and a base. The sliding body has a swinging rode and is movably provided in the support. The base is connected to the support. The support has an elastic recovering means and a return path means. One end of the elastic recovering means is connected to the support, while the other end thereof is connected to the sliding body. The elastic recovering means provides a force for automatic recovery. The swinging rod is located above the return path means. In use, with the vertical movement of the sliding body in the support and the cooperation of the swinging rod and the return path means, the height of the supporting stand can be adjusted according to the user's demand. Via aforementioned arrangement, a supporting stand with no tenons on its external surface can be formed.

7 Claims, 9 Drawing Sheets

SUPPORTING STAND HAVING LIFTING AND POSITIONING MEANS

BACKGROUND OF THE INVENTION

1. Field of the Invention

The present invention relates to a supporting device, and in particular to a supporting stand having a lifting and positioning means; wherein the external surface of the supporting stand is not provided with any keys, and with the cooperation of elastic elements, rods, and tracks, the height of the supporting stand can be adjusted freely, thereby lifting or lowering a display connected thereon to conform to a user's demand:

2. Description of Related Art

An earlier panel display is connected via a supporting stand, and it can be made upright so that a user can watch the display conveniently. However, the height of such a supporting stand cannot be adjusted. Therefore, when a user intends to adjust the height of the panel display, the user has to raise the supporting article under the panel display, such as via adjusting the height of a table or increasing the number of articles under the supporting stand, thereby increasing the height of the panel display.

Figure 1:
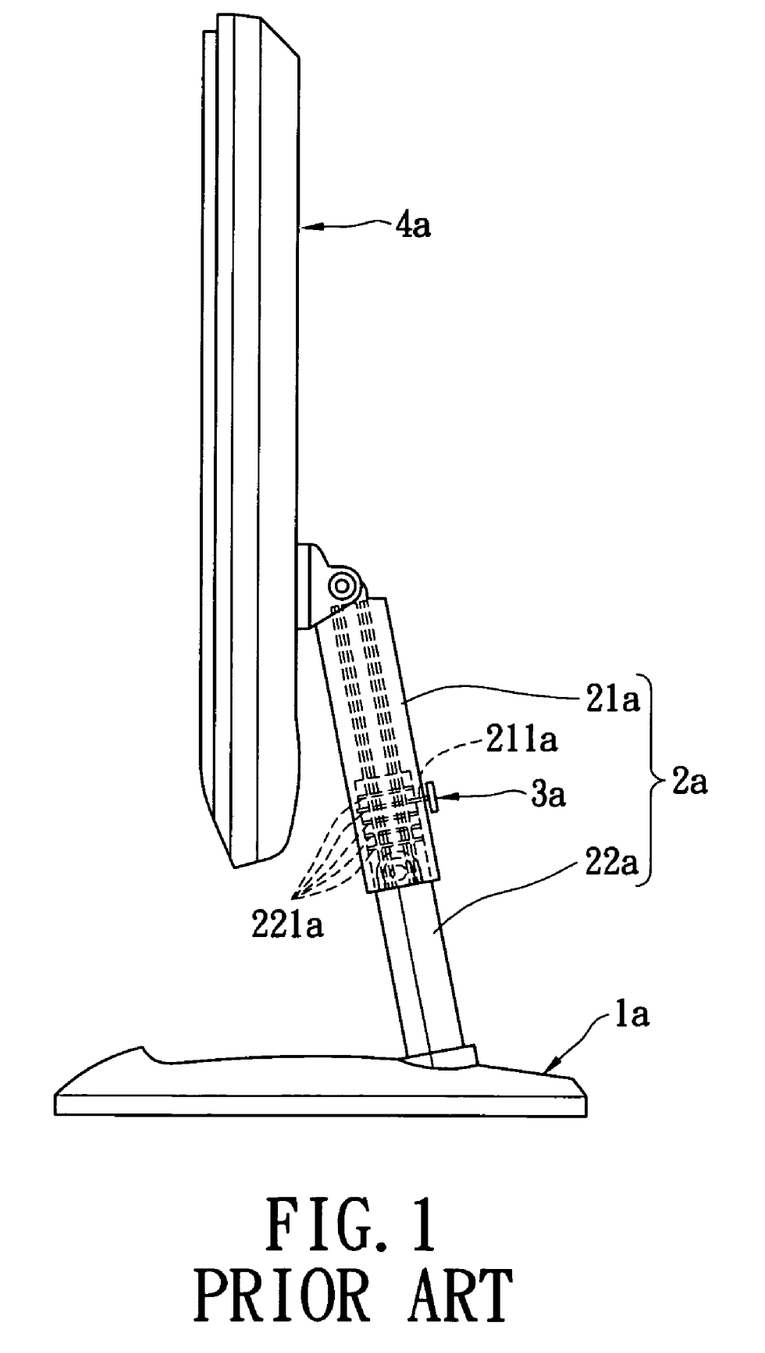
FIG. 1 is a schematic view showing a conventional supporting stand.

The conventional supporting stand can only provide a supporting effect, and thus it is not convenient for use. Therefore, there has been attempt to improve the supporting stand, so that it can be lifted or lowered. Via the cooperation of a telescopic supporting stand with a positioning means (such as tenons), the panel display can be fixed to a certain position. Please refer to FIG. 1. This figure discloses a supporting stand of a display having a lifting effect, which includes a base $1a$, a supporting stand $2a$ connected with the base $1a$, and a positioning element $3a$. The supporting stand $2a$ has a first connecting portion $21a$ and a second connecting portion $22a$. The first connecting portion $21a$ is provided with a positioning hole $211a$. The second connecting portion $22a$ is provided with a plurality of fixing holes $221a$ that are arranged at equal intervals. The first connecting portion $21a$ is movably connected to the second connecting portion $22a$. One end of the first connecting portion $21a$ is further connected to a panel display $4a$. One end of the first connecting portion $22a$ is connected to the base $1a$. The positioning element $3a$ is a tenon. According to the desired height, the user selectively inserts the positioning element $3a$ into the positioning hole $211a$ and the fixing holes $221a$. In this way, the first connecting portion $21a$ can be fixed and the panel display can be lifted or lowered. Thus, the problems occurred in the conventional supporting stand can be solved. However, since the movement between the first connecting portion $21a$ and the second connecting portion $22a$ requires a suitable gap therebetween, shake and swing may be generated when the first connecting portion $21a$ is moved. As a result, the supporting stand may suffer damage after being used for a period of time.

Taiwan Patent No. M324945 discloses an improved supporting stand of a display, which includes a base a supporting stand provided on the base. The support has tracks, a restricting portion provided on the tracks, a secondary support and a sliding portion provided in the secondary support and extending in the tracks. The secondary support and the sliding portion are connected to the tracks, so that the sliding portion can be slidably provided in the tracks within the restricting portion. Via this arrangement, the display can be lifted and lowered.

However, the above-mentioned supporting stand has some problems as follows.

(I) Due to the existence of a conventional positioning element, the external surface of the supporting stand is provided with a protrusion (i.e. the tenon), which deteriorates the whole visual effect of the supporting stand.

(II) The conventional positioning element is used to fix the supporting stand, which may cause the supporting stand to suffer damage.

(III) Even when there is no positioning element (as disclosed in the above patent publication), the lifting means of the conventional supporting stand is so complicated that the manufacturing cost is increased. Accordingly, it is not easy to assemble the supporting stand, which increases the time for assembling.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide a supporting stand having a lifting and positioning means. The external surface of the supporting stand is not provided with any keys (i.e. tenons). With the cooperation of the rods, elastic elements, and tracks within the supporting stand, the supporting stand can be designed to have an elegant profile, simple structure, and lifting effect.

In order to achieve the above objects, the present invention provides a supporting stand having a lifting and positioning means, which includes a base, a support provided on the base, the support having an elastic recovering means and a return path means, one end of the elastic recovering means being connected to one end of the support, the return path means being provided below the elastic recovering means; and a sliding body with its one end connected to the other end of the elastic recovering means, the sliding body being slidably provided on the support, the return path means guiding the sliding body.

The supporting stand having a lifting and positioning means according to the present invention has advantageous features as follows.

(I) The external surface of the supporting stand of the present invention is not provided with any keys (i.e. tenons), so that its profile is beautiful and elegant.

(II) The supporting stand having a lifting and positioning means according to the present invention can be lifted or lowered, so that its height can be adjusted freely according to the user's demand.

(III) The supporting stand having a lifting and positioning means according to the present invention has a simple structure and thus can reduce the manufacturing cost. Furthermore, it is convenient to assemble the present invention, so that the time for assembling can be reduced substantially.

(IV) The supporting stand having a lifting and positioning means according to the present invention can be operated easily, which demonstrates practicability.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF PREFERRED EMBODIMENTS

Figure 2:
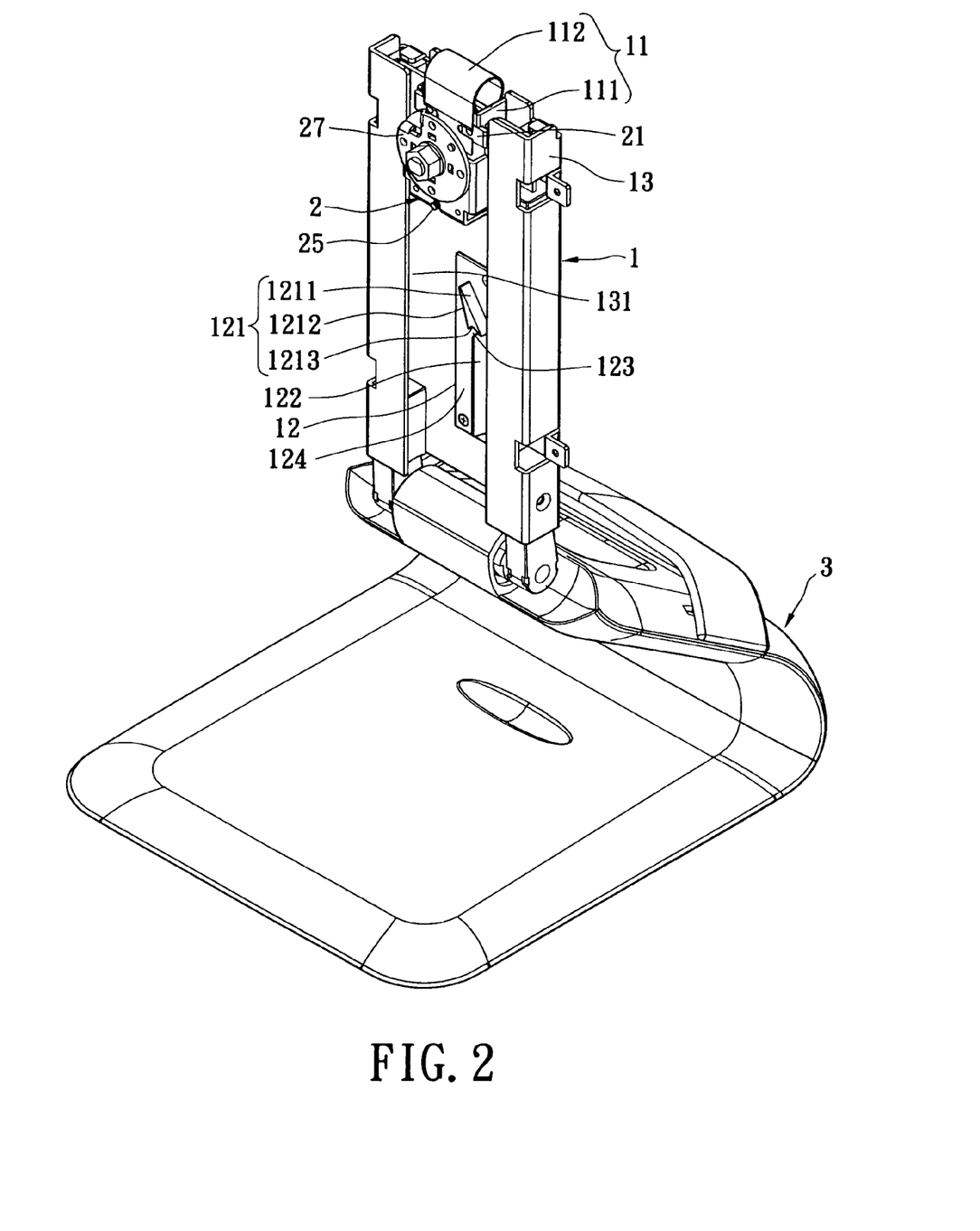
FIG. 2 is perspective view showing a supporting stand having a lifting and positioning means according to the present invention.

Please refer to FIG. 2. The present invention provides a supporting stand having a lifting and positioning means, which includes a support 1, a sliding body 2, and a base 3. One end of the support 1 is provided on the base 3, so that the support can be fixed firmly via the base 3. The sliding body 2 is movably provided in the support 1.

Figure 3:
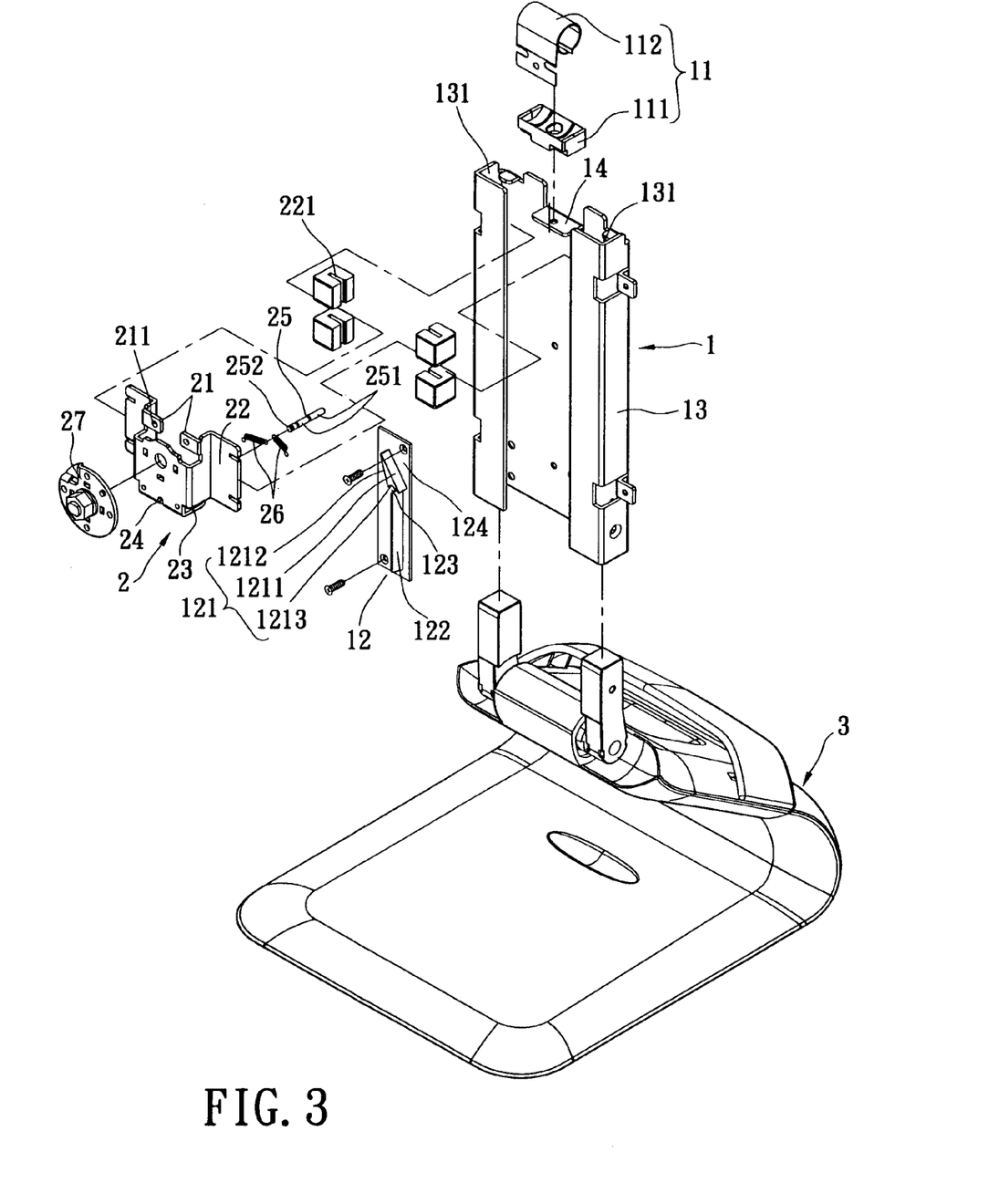
FIG. 3 is an exploded view showing a supporting stand having a lifting and positioning means according to the present invention.

Please refer to FIG. 3. The support 1 has an elastic recovering means 11, a return path means 12, two bent plates 13, and a connecting portion 14. Left and right sides of the support 1 extend to form the two bent plates 13. The two bent plates 13 form two grooves 131. The connecting portion 14 is a plate extending from one end of the support 1. The connecting portion 14 is connected to the elastic recovering means 11.

The elastic recovering means 11 comprises a connecting piece 111 and an elastic element 112. The connecting piece 111 is fixedly connected to the connecting portion 14. One end of the elastic element 112 is connected to the connecting piece 111, while the other end thereof is connected to the sliding body 2. Since the elastic element 112 provides an elastic recovering force, the elastic element 112 may be a torsion spring, a compression spring, or a tension spring.

The return path means 12 comprises a guiding block 121 and a separating plate 122. The guiding block 121 is separated from the separating plate 122 by a distance. The guiding block 121 and the separating plate 122 are provided on a substrate 124, and the separating plate 122 is located below the guiding block 121. Furthermore, a channel 123 is formed between the guiding block 121 and the separating plate 122.

The guiding block 121 has a first guiding slope 1211, a second guiding slope 1212, and a restricting groove 1213. The second guiding slope 1212 is adjacent to the first guiding slope 1211. The restricting slope 1213 is adjacent to the channel 123, and the restricting groove 1213 is provided between the first guiding slope 1211 and the second guiding slope 1212.

The sliding body 2 has two fixing portions 21, two sliding portions 22, a supporting portion 23, a restricting hole 24, and a swinging rod 25. The two fixing portions 21 are provided at one end of the sliding body 2, and they are two plates extending from one end of the sliding body 2. The two fixing portions 21 are provided with two through holes 211. Via the two through holes 211, two screws (not shown) are used to connect the other end of the elastic element 112 to the fixing portion 21, so that the elastic element 112 can provide an elastic recovering force to the sliding body 2. In this way, the sliding body 2 can return to its original position elastically.

The two sliding portions 22 are two plates extending from left and right sides of the sliding body 2. The two sliding portions 22 are further connected with a plurality of sliding blocks 221. The sliding blocks 221 are movably inserted into the groove 131 of the support 1, so that the sliding body 2 can be lifted and lowered freely in the support 1.

Figure 4:
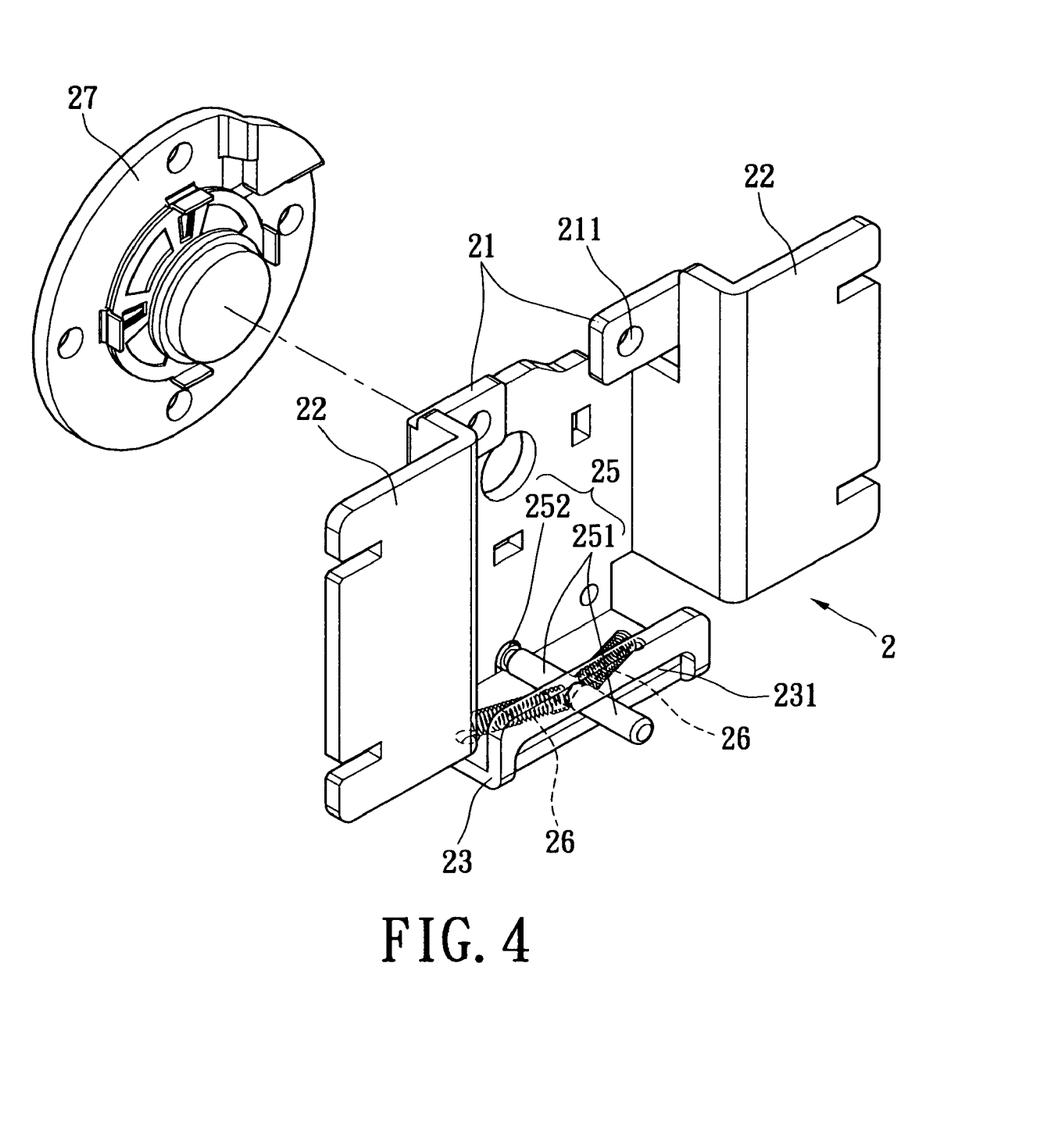
FIG. 4 is an exploded view showing a sliding body of a supporting stand having a lifting and positioning means according to the present invention.

Please refer to FIG. 4. The supporting portion 23 is a bent plate extending from one end of the sliding body 2. The supporting portion 23 is used to provide a supporting force, whereby the supporting portion 23 can abut the swinging rod 25. The supporting portion 23 is provided with a restricting port 231 that penetrates through the supporting portion 3 for restricting the moving direction.

The restricting hole 24 is an open hole for the sliding body 2 and adjacent to the supporting portion 23. The restricting hole 24 is used to fix the swinging rod 25. The swinging rod 25 has a movable portion 251 and a receiving portion 252. The movable portion 251 is a cylindrical rod, and an end of the movable portion 251 is formed into a sphere. The receiving portion 252 is a base having an accommodating trough. The sphere-like end of the movable portion 251 is movably inserted into the movable portion 251, so that the swinging rod 25 can swing freely.

The receiving portion 252 of the swinging rod 25 is further fixed in the restricting hole 24 of the sliding body 2. The movable portion 251 of the swinging rod 25 abuts the supporting portion 23 horizontally and passes through the restricting port 231 of the supporting portion 23. The movable portion 251 is exposed to the outside via the restricting port 231. The restricting port 231 is used to restrict the moving direction of the movable portion 251 of the swinging rod 25, so that the movable portion 251 can be moved leftward or rightward. The movable portion 251 of the swinging rod 25 is a free end for swinging leftward or rightward, while the receiving portion 252 of the swinging rod 25 may be a fixed end. Therefore, when no external force is exerted, the movable portion 251 of the swinging rod 25 is kept in the central position without swinging. If there is an external force, the movable portion 251 of the swinging rod 25 affected by the external force can swing leftward or rightward. In addition, the sliding body 2 is further provided with a pair of swing balance elements 26 and an assembly 27. The swing balance element 26 is a compression spring or a tension spring. One ends of the swing balance elements 26 are connected to the swinging rod 25. The other ends of the swing balance elements 26 are connected to left and right sides of the supporting portion 23 respectively, thereby keeping the swinging rod 25 in a central position. One side of the assembly 27 is connected to the sliding body 2. The other side of the assembly 27 is connected to a display (not shown). In this way, the display (not shown) can be combined with the supporting stand having a lifting and positioning means according to the present invention.

Figure 5:
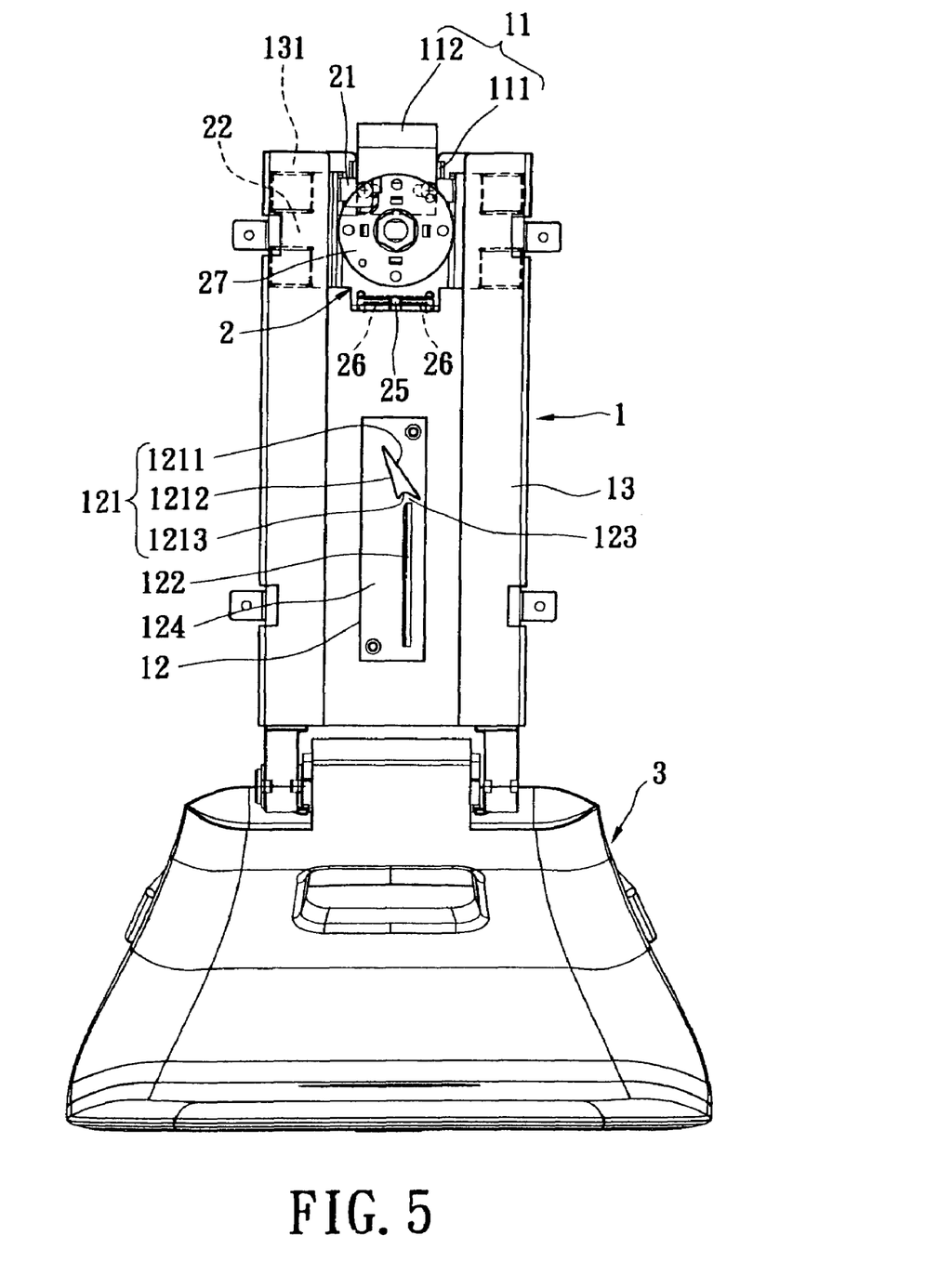
FIG. 5 is a schematic view showing an operating state of a supporting stand having a lifting and positioning means according to the present invention.
Figure 6:
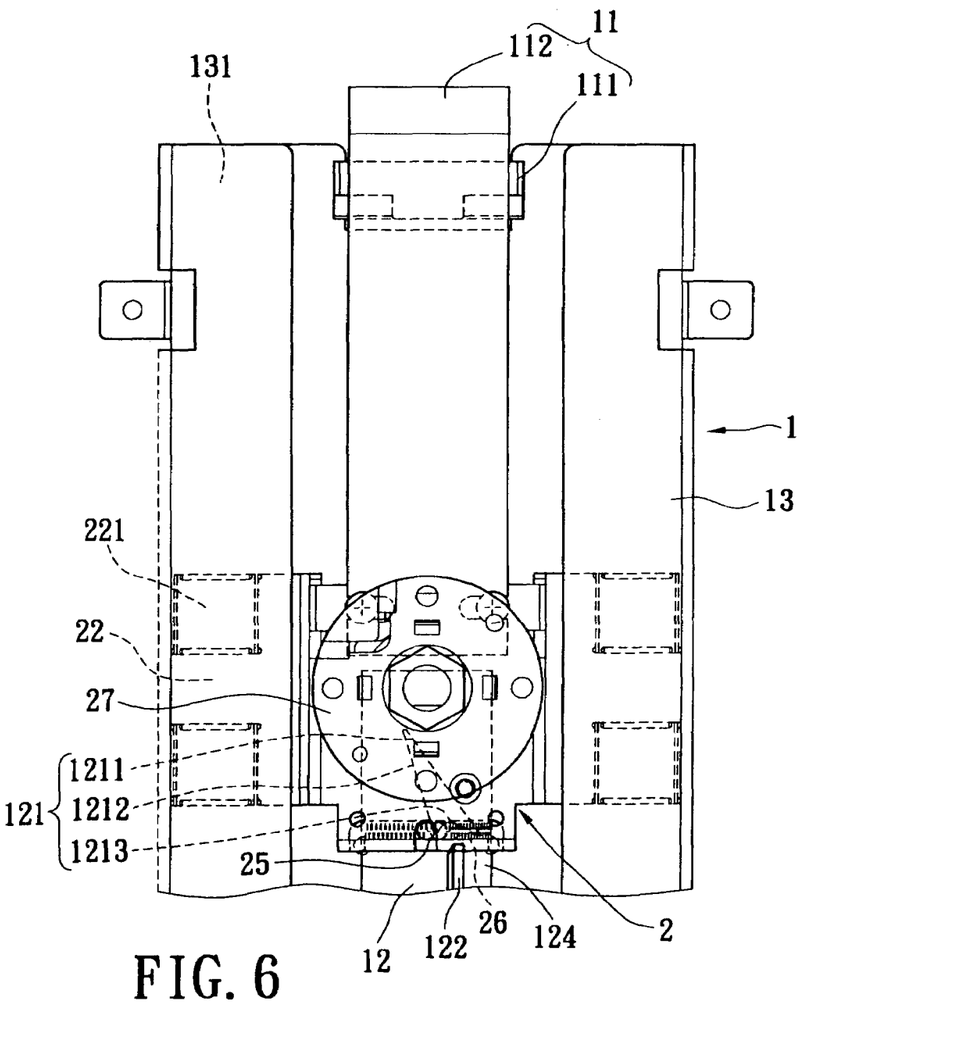
FIG. 6 is a schematic view showing another operating state of a supporting stand having a lifting and positioning means according to the present invention.
Figure 6A:
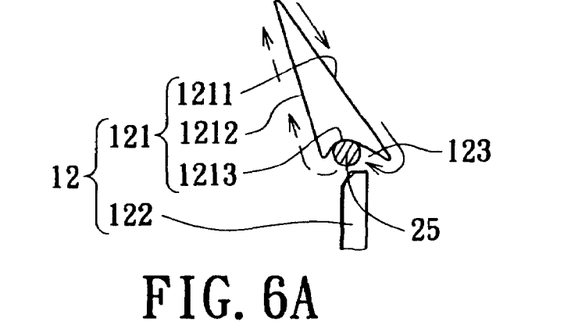
FIG. 6A is a schematic view showing a moving path of a swinging rod of a supporting stand having a lifting and positioning means according to the present invention.

Please refer to FIGS. 5 to 6A. Since the swinging rod 25 is located above the guiding block 121, in use, a first external force is exerted on the sliding body 2, thereby causing the sliding body 2 to move on the support 1 toward the base 3. The swinging rod 25 moves and abuts the first guiding slope 1211 based on the movement of the sliding body 2. Accordingly, the movable portion 251 of the swinging rod 25 can move along the first guiding slope 1211. The first guiding slope 1211 guides the movable portion 251 of the swinging rod 25 into the channel 123 between the guiding block 121 and the separating plate 122. The channel 123 further guides the movable portion 251 of the swinging rod 25 into the restricting groove 1213. The movable portion 251 of the swinging rod 25 is fixedly restricted in the restricting groove 1213. In this way, the height of the supporting stand of the present invention can be reduced to conform to the user's demand.

When the user intends to increase the height of the supporting stand of the present invention, the user can exert a second external force on the sliding body 2, thereby causing the sliding body 2 to move toward the base 3 again. Due to the driving of the sliding body 2, the movable portion 251 of the swinging rod 25 is removed from the restricting groove 1213 and moves toward the separating plate 12. The movable portion 251 of the swinging rod 25 further abuts the separating plate 122, so that the movable portion 251 of the swinging rod 25 moves along the separating plate 122 and escapes from the channel 123. Thereafter, the second external force is released. Via the elastic recovering force exerted by the elastic element 112 of the elastic recovering means 11, the sliding body 2 raises in the support 1 to cause the swinging rod 25 to raise accordingly. As a result, the movable portion 251 of the swinging rod 25 abuts the second guiding slope 1212 and moves along the second guiding slope 1212 until the sliding body 2 returns its original position. Via the above actions, the user can adjust the height of the supporting stand of the present invention according to the user's demand.

Figure 7:
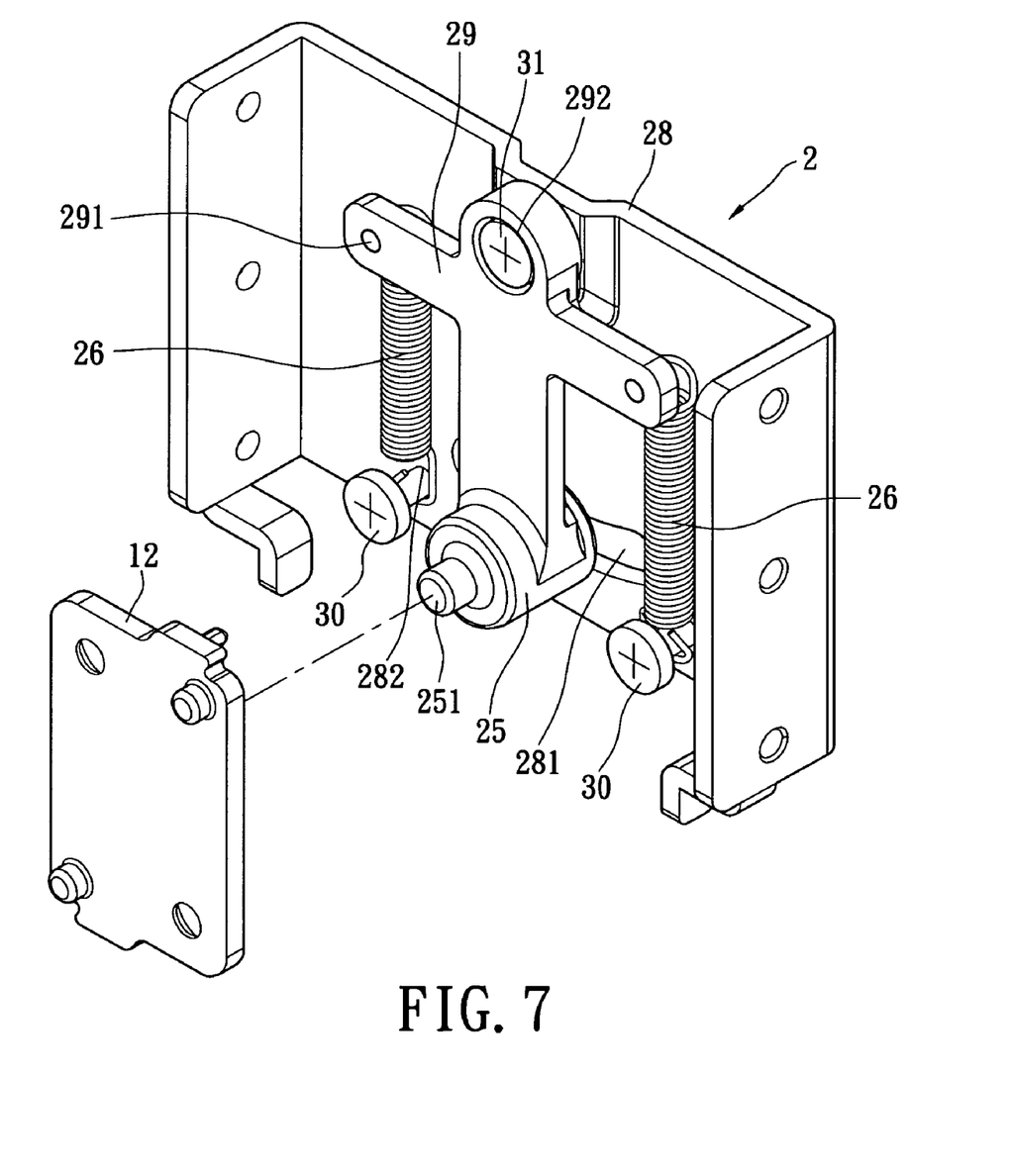
FIG. 7 is a perspective view showing a sliding body and a return path means of another embodiment of the present invention.
Figure 8:
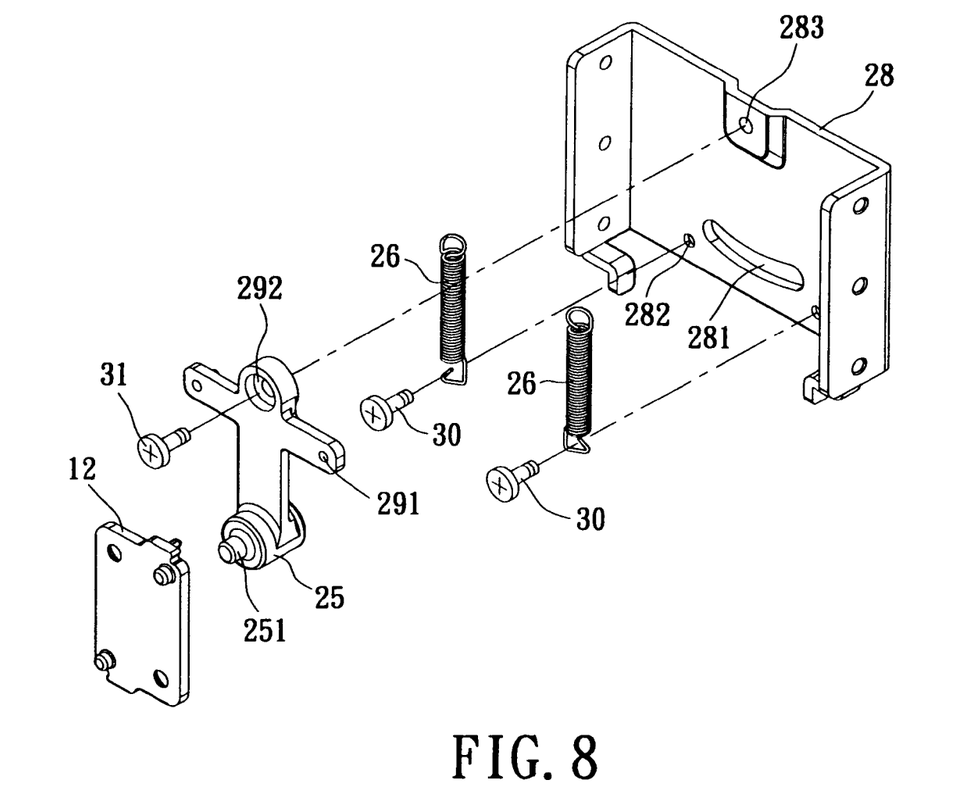
FIG. 8 is an exploded view showing the sliding body and the return path means of another embodiment of the present invention.
Figure 9:
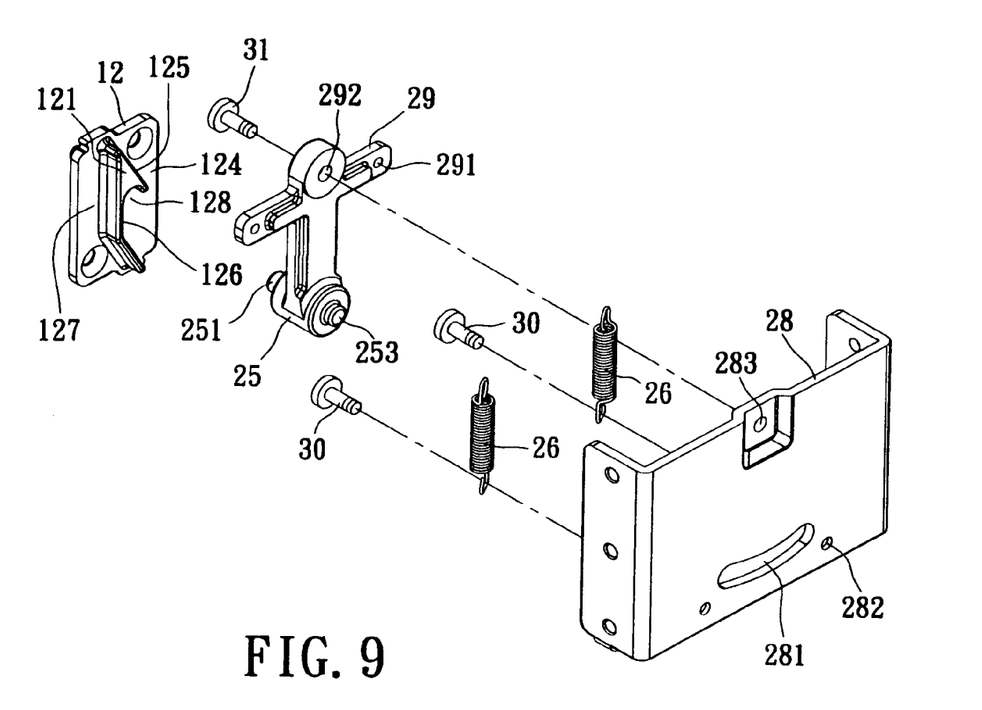
FIG. 9 is an exploded view showing the sliding body and the return path means of another embodiment of the present invention along another angle.

Please refer to FIGS. 7 to 9, which show another embodiment of the present invention. In the present embodiment, the return path means 12 comprises a guiding block 121 and a substrate 124. The guiding block 121 is provided on the substrate 124, and the guiding block 121 has a first guiding surface 125, a second guiding surface 126, a third guiding surface 127, and an accommodating trough 128. The first guiding surface 125, the second guiding surface 126, and the third guiding surface 127 are adjacent to each other. The accommodating trough 128 is provided between the first guiding surface 125 and the second guiding surface 126.

In the present embodiment, the sliding body 2 comprises a pair of swing balance elements 26, a first sliding piece 28, a second sliding piece 29, and a set of balancing rods 30. The second sliding piece 29 is rotatably connected on the first sliding piece 28. The set of balancing rods 30 are connected to the first sliding piece 28. One ends of the swing balance elements 26 are connected to left and right sides of the second sliding piece 29. The other ends of the swing balance elements 26 are connected to the set of balancing rods 30. Furthermore, the swing balance elements 26 can be a compression spring or a tension spring.

The first sliding piece 28 is provided with a guiding groove 281, two holes 282, and a first connecting hole 283. The guiding groove 281 is provided between the first connecting hole 283 and the two holes 282. The two holes 282 are located on left and right sides of the guiding groove 281. The guiding groove 281 provides a guiding effect. The set of balancing rods 30 are inserted into the two holes 282 and are fixed thereto.

The second sliding piece 29 is formed into a cross-like piece with its one end having a swinging rod 25. The second sliding piece 29 is further provided with two holes 291 and a second connecting hole 292. The second connecting hole 292 is located at the other end of the second sliding piece 29. The two holes 291 are located on left and right sides of the second sliding piece 29. The second connecting hole 292 and the first connecting hole 283 are commonly penetrated by a connecting element 31, so that the second sliding piece 29 can be rotatably connected to the first sliding piece 28. One ends of the swing balance elements 26 are fixedly connected into the two holes 291. One ends of the swing balance elements 26 are fixedly connected to the set of balancing rods 30, thereby keeping the second sliding piece 29 in the central position.

The swinging rod 25 further has a movable portion 251 and a guiding portion 253. The movable portion 251 is a block formed by protruding from one end of the swinging rod 25. The guiding portion 253 is a guiding block formed by protruding from the other end of the swinging rod 25. The movable portion 251 contacts the guiding block 121, so that the movable portion 251 is guided by the guiding block 121 to make the second sliding piece 29 to swing leftward or rightward accordingly. The guiding portion 253 of the swinging rod 25 is slidingly inserted into the guiding groove 281. The guiding groove 281 provides a guiding effect, thereby making the second sliding piece 29 to swing leftward or rightward smoothly.

Figure 10:
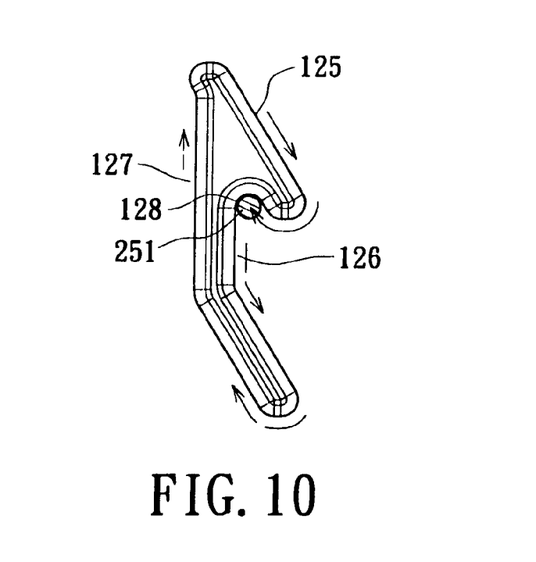
FIG. 10 is a schematic view showing the operating state of another embodiment.

Please refer to FIG. 10. In use, the sliding body 2 moves on the support 1 toward the base 3. The swinging rod 25 moves and abuts the first guiding surface 125 according to the movement of the sliding body 2. In this way, the movable portion 251 of the swinging rod 25 moves along the first guiding surface 125. The first guiding surface 125 guides the movable portion 251 into the accommodating trough 128, and the movable portion 251 is fixedly restricted in the accommodating trough 128, thereby reducing the height of the supporting stand of the present invention.

If the user intends to increase the height of the supporting stand of the present invention, the sliding body 2 moves toward the base 3 again. Due to the driving of the sliding body 2, the movable portion 251 of the swinging rod 25 is removed from the accommodating trough 128 and moves along the second guiding surface 126. Then, the movable portion 251 leaves the second guiding surface 126. The movable portion 251 is affected by the swing balance elements 26 so as to make the second sliding piece 29 to return to the central position. Also, the swinging rod 25 returns to the central position accordingly. Thereafter, due to the elastic recovering force of the elastic element 112 of the elastic recovering means 11, the sliding body 2 raises in the support 1, so that the movable portion 251 abuts the third guiding surface 127 and moves along the third guiding surface 127 until the sliding body returns to its original position. Via the above action, the height of the supporting stand of the present invention can be adjusted freely based on the user's demand.

According to the above, the supporting stand having a lifting and positioning means of the present invention has advantageous features and functions as follows.

(I) With no key (i.e. tenon), the external appearance of the present invention is beautiful and elegant.

(II) The height of the supporting stand of the present invention can be adjusted based on the user's demand.

(III) Via simply utilizing a simple structure, it is easy and convenient to lift or lower the supporting stand of the present invention.

(IV) It is very easy and convenient to operate the present invention, and thus the present invention really has practicability.

(V) Since the present invention is simple in structure, the manufacturing cost and time for assembling can be reduced substantially.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A supporting stand having a lifting and positioning means, comprising:
    a base;
    a support provided on the base, the support having an elastic recovering means and a return path means, one end of the elastic recovering means being connected to one end of the support, the return path means being provided below the elastic recovering means, the return path means including a guiding block, the guiding block being provided on a substrate and being formed with a first guiding surface, a second guiding surface, a third guiding surface, and an accommodating trough, the first guiding surface, the second guiding surface and the third guiding surface being adjacent to each other, the accommodating trough being provided between the first guiding surface and the second guiding surface; and
    a sliding body with its one end connected to the other end of the elastic recovering means, the sliding body being movably provided on the support, the return path means guiding the sliding body.

2. The supporting stand having a lifting and positioning means according to claim 1, wherein the sliding body comprises a first sliding piece and a second sliding piece, the second sliding piece is rotatably connected to the first sliding piece, the first sliding piece is provided with a guiding groove, the second sliding piece has a swinging rod, one end of the swinging rod is slidingly inserted into the guiding groove.

3. The supporting stand having a lifting and positioning means according to claim 2, wherein the swinging rod further comprises a movable portion and a guiding portion, the movable portion and the guiding portion are located on both ends of the swinging rod, the movable portion abuts the guiding block, the guiding block guides the movable portion to move on the guiding block, the guiding portion is movably inserted into the guiding groove.

4. The supporting stand having a lifting and positioning means according to claim 2, wherein the sliding body is further provided with a pair of swing balance elements and a set of balancing rods, the set of balancing rods are connected to the first sliding piece, one ends of the swing balance elements are connected to the second sliding piece, and the other ends thereof are connected to the set of balancing rods respectively.

5. The supporting stand having a lifting and positioning means according to claim 4, wherein the first sliding piece is provided with two holes, the second sliding piece is provided with two holes, the two holes are provided on left and right sides of the guiding groove, the set of balancing rods are inserted in the two holes, the two holes are provided on left and right sides of the second sliding piece, one ends of the pair of the swing balance elements are fixed into the two holes, the other ends of the pair of swing balance elements are fixedly connected to the set of balancing rods.

6. The supporting stand having a lifting and positioning means according to claim 5, wherein the swing balance element is a compression spring or a tension spring.

7. The supporting stand having a lifting and positioning means according to claim 2, wherein the first sliding piece is further provided with a first connecting hole, the second sliding piece is further provided with a second connecting hole, the first connecting hole and the second connecting hole are commonly penetrated by a connecting element.

* * * * *